(12) United States Patent
Park et al.

(10) Patent No.: US 8,126,005 B2
(45) Date of Patent: Feb. 28, 2012

(54) BEACON TRANSMISSION METHOD AND BEACON TRANSMISSION APPARATUS

(75) Inventors: Tae Rim Park, New York, NY (US); Myung Jong Lee, New York, NY (US); Ji Tae Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1241 days.

(21) Appl. No.: 11/833,655

(22) Filed: Aug. 3, 2007

(65) Prior Publication Data

US 2008/0031199 A1  Feb. 7, 2008

Related U.S. Application Data (60) Provisional application No. 60/835,110, filed on Aug. 3, 2006.

(30) Foreign Application Priority Data

Nov. 24, 2006  (KR) .................. 10-2006-0117058

(51) Int. Cl.
*H04J 3/17* (2006.01)
(52) U.S. Cl. ........ 370/433; 370/329; 370/431; 370/458; 370/459
(58) Field of Classification Search .................. 370/310, 370/328, 329, 336, 431, 433, 458, 459
See application file for complete search history.

(56) References Cited

U.S. PATENT DOCUMENTS

| | | | |
|---|---|---|---|
| 6,735,488 B2 | 5/2004 | Kadowaki et al. | |
| 7,573,865 B2 * | 8/2009 | Shvodian | 370/350 |
| 7,706,404 B2 * | 4/2010 | Fleming | 370/468 |
| 2005/0286480 A1 * | 12/2005 | Akiyama | 370/338 |
| 2008/0253327 A1 * | 10/2008 | Kohvakka et al. | 370/330 |
| 2009/0310573 A1 * | 12/2009 | Sim et al. | 370/336 |

FOREIGN PATENT DOCUMENTS

| | | |
|---|---|---|
| JP | 2005-094169 A | 4/2005 |
| JP | 2005-303437 A | 10/2005 |
| KR | 10-2005-0025053 A | 3/2005 |
| KR | 10-2006-0050947 A | 5/2006 |
| KR | 10-2006-0051174 A | 5/2006 |
| WO | 2005064853 A1 | 7/2005 |
| WO | WO 2006049415 A1 * | 5/2006 |

* cited by examiner

*Primary Examiner* — Chi Pham
*Assistant Examiner* — Weibin Huang
(74) *Attorney, Agent, or Firm* — Sughrue Mion, PLLC (57) ABSTRACT

A communication apparatus, wherein the communication apparatus selects a superframe from W consecutive superframes, and starts each of the W consecutive superframes without transmitting a beacon in a first time period of each of the W consecutive superframes when a superframe to be started is different from the selected superframe.

13 Claims, 5 Drawing Sheets

BEACON TRANSMISSION METHOD AND BEACON TRANSMISSION APPARATUS

CROSS-REFERENCE TO RELATED APPLICATION

This application claims priority from Korean Patent Application No. 10-2006-0117058, filed on Nov. 24, 2006, in the Korean Intellectual Property Office, and the benefit of U.S. Provisional Application No. 60/835,110, filed on Aug. 3, 2006, the entire disclosures of which are incorporated herein by reference.

BACKGROUND OF THE INVENTION

1. Field of the Invention

Methods and apparatuses consistent with the present invention relate to a beacon transmission in a wireless network, and more particularly, to a beacon transmission which overcomes a service hole problem which occurs in a hard time beacon scheme.

2. Description of Related Art

Wireless sensor networks have received a great deal of attention for several years, since wireless sensor networks envision many useful applications ranging from environmental monitoring to home automation. One essential networking function in distributed sensor networks is broadcasting, since distributed sensor networks support device discoveries, route discoveries, and network maintenance. In order to keep network information updated, a broadcast message is transmitted periodically. Based on time characteristics, broadcasting is classified into three categories: hello message, soft-time beacon, and hard-time beacon. The hard-time beacon is more beneficial to low-power and low-rate networks, as the hard-time beacon may define strict time periods for wake-up and sleep.

Figure 1:
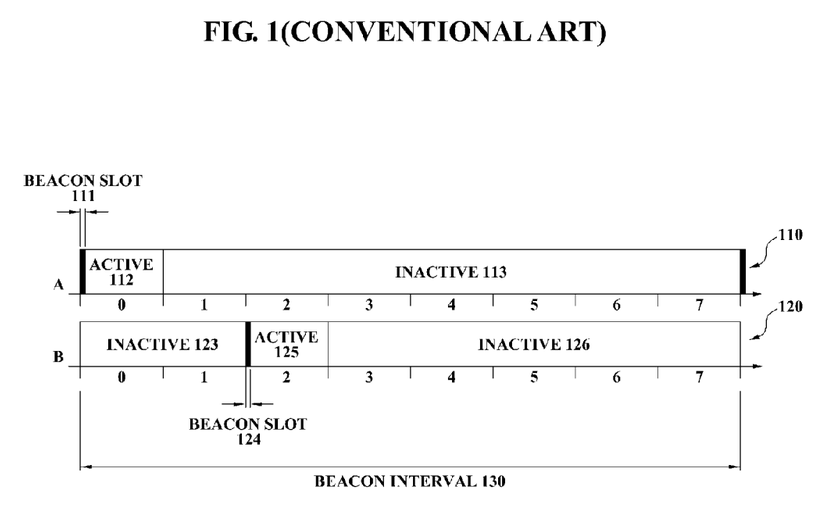
FIG. 1 is a diagram illustrating a hard-time beacon scheme according to an Institute of Electrical and Electronics Engineers (IEEE) 802.15.4.

FIG. 1 is a diagram illustrating a hard-time beacon scheme according to an Institute of Electrical and Electronics Engineers (IEEE) 802.15.4 standard.

Communication apparatuses in the IEEE 802.15.4 network transmit a beacon at a scheduled time and start a superframe. A communication apparatus A and a communication apparatus B transmit the beacon at regular intervals, as illustrated in FIG. 1. In a hard-time beacon scheme, the beacon is periodically broadcasted. In FIG. 1, a beacon interval 130 indicates a time interval from a beacon slot to a subsequent beacon slot. The communication apparatuses in the hard-time beacon scheme transmit the beacon at fixed beacon intervals. When the beacon is transmitted at the scheduled time, beacons transmitted by different communication apparatuses may collide. As an example, in FIG. 1, when the communication apparatus A and the communication apparatus B transmit during a beacon slot 111 and a beacon slot 124 at a same time, respectively, a beacon collision may occur.

Unlike data packet collision, a periodic hard-time beacon collision is permanent in nature, since a beacon period is the same for all nodes in the network. If the beacons from two or more adjacent nodes collide, any nodes in an overlapped transmission area are not able to receive the beacon. This area is called a service hole, and such problem is called a service hole problem.

Figure 2:
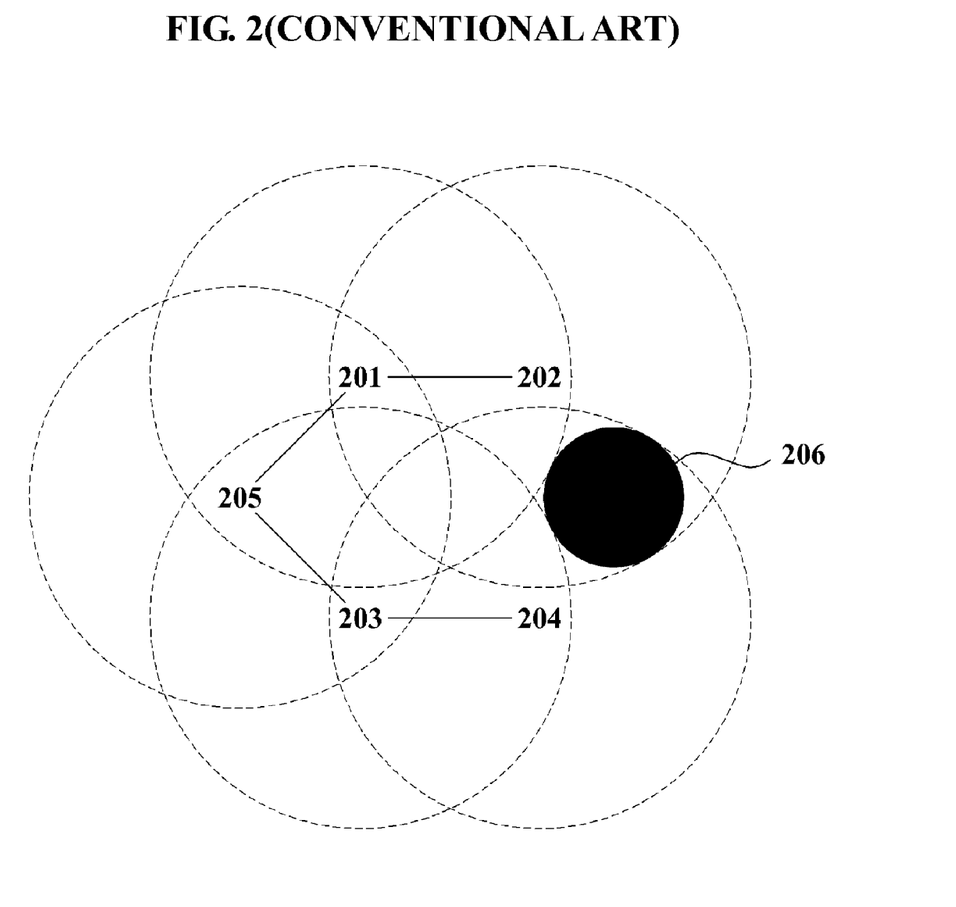
FIG. 2 is a diagram illustrating a service hole problem according to a conventional art.

FIG. 2 is a diagram illustrating a service hole problem according to a conventional art.

To overcome the service hole problem, a well designed beacon scheduling is required. For this, nodes 201, 202, 203, 204, and 205 in a network may exchange information. In FIG. 2, when the nodes 201, 202, 203, 204, and 205 exchange hop information, the node 202 and the node 204 may not obtain hop information of the node 204 and the node 202, although the node 202 and the node 204 have an overlapped area 206. In this case, when the node 202 and the node 204 transmit a beacon by using a hard-time beacon scheme, and once a beacon collision occurs, the beacon collision becomes permanent and the overlapped area 206 becomes a service hole. Even when In hop information having at least 2 hops is exchanged, the service hole may still exist. In the service hole, a new device may not join the network.

Thus, a beacon transmission method and apparatus thereof which overcome a service hole problem which occurs in a hard time beacon scheme is needed.

SUMMARY OF THE INVENTION

The present invention provides a stochastic beacon transmission method and apparatus thereof which may overcome a service hole problem, when nodes in a network use a hard-time beacon.

The present invention also provides a stochastic beacon transmission method and apparatus thereof which eliminate a permanent beacon collision which occurs in a hard-time beacon scheme, with little overhead.

According to an aspect of the present invention, there is provided a communication apparatus, wherein the communication apparatus selects a superframe from W consecutive superframes, and starts each of the W consecutive superframes without transmitting a beacon in a first time period of each of the W consecutive superframes when a superframe to be started is different from the selected superframe. Each of the W consecutive superframes includes the first time period and a second time period, the first time period and the second time period are exclusive of each other, and W is greater than or equal to 2.

According to an aspect of the present invention, the selected single superframe is randomly selected from the W consecutive superframes. The communication apparatus transmits the beacon in a first time period of the selected superframe, when the superframe to be started is the selected superframe.

According to another aspect of the present invention, there is provided a beacon transmission method, including: selecting a superframe from W consecutive superframes; and starting each of unselected superframes of the W consecutive superframes without transmitting a beacon in a first time period of the each of the unselected superframes.

According to still another aspect of the present invention, there is provided a beacon transmission method, including: selecting a beacon transmission counter from 0 to W−1, W indicating a predetermined number of consecutive superframes; and transmitting a beacon in a first time period of a superframe to be started, when each of W consecutive superframes starts and the beacon transmission counter corresponds to 0. The beacon transmission method further includes decreasing the beacon transmission counter by 1 and not transmitting the beacon in the first time period of the superframe to be started, when the each of the W consecutive superframes starts and the beacon transmission counter is different from 0. Also, the communication apparatus transmits data or waits for receiving data in a second time period of the superframe to be started, when the each of W number of consecutive superframes starts and the beacon transmission counter is different from 0.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS OF THE INVENTION

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 3:
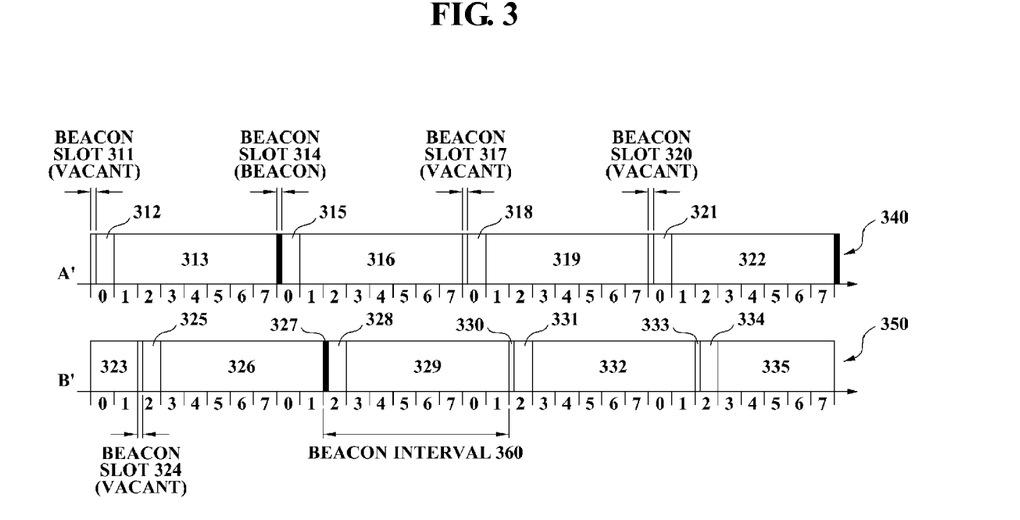
FIG. 3 is a diagram illustrating a hard-time beacon scheme according to an exemplary embodiment of the present invention.

FIG. 3 is a diagram illustrating a hard-time beacon scheme according to an exemplary embodiment of the present invention.

The present invention includes 1) a stochastic beacon transmission, 2) a superframe by timer, 3) a division of superframe. For better understanding of the present invention, the present invention is described in comparison with an Institute of Electrical and Electronics Engineers (IEEE) 802.15.4 in a conventional art.

A superframe is defined as a time interval. In the IEEE 802.15.4, a single superframe is defined as a time interval from a beacon slot to a subsequent beacon slot. In FIG. 1, a beacon interval 130 corresponds to a time interval from a beacon slot to a subsequent beacon slot. In this case, the superframe is identical to the beacon interval 130. FIG. 1 illustrates a superframe of a communication apparatus A 110 and a superframe of a communication apparatus B 120. The communication apparatus A starts the superframe of the communication apparatus A 110, when transmitting a beacon in a beacon slot 111. An active slot 112 and an inactive slot 113 follow the beacon slot 111. Similarly, a beacon slot 124, an active slot 125, and an inactive slot 126 follow another inactive slot 123, with respect to the communication apparatus B.

In the present invention, a beacon transmission window is defined. The beacon transmission window indicates predefined consecutive superframes. A size of the beacon transmission window W indicates a number of superframes included in the beacon transmission window. Although the size of the beacon transmission window W is 4 in FIG. 3, another value greater than or equal to 2 may be selected. Accordingly, at least two consecutive superframes are included in a single beacon transmission window. The superframes included in the beacon transmission window are equal in length.

Each of the superframes includes a first time period, a second time period, and a third time period. The first time period, the second time period, and the third time period are exclusive of each other. In the exemplary embodiment of the present invention, the first time period indicates a beacon slot, the second time period indicates an active slot, and the third time period indicates an inactive slot. However, according to another exemplary embodiment of the present invention, a single superframe may be divided into at least two time periods, or may be divided into at least four time periods. Also, a function of each time period may be variously defined.

FIG. 3 illustrates a superframe 340 of a communication apparatus A' and a superframe 350 of a communication apparatus B'. In FIG. 3, a beacon transmission window of the communication apparatus A' includes four superframes. An $11^{th}$ superframe includes a beacon slot 311, an active slot 312, and an inactive slot 313. A $12^{th}$ superframe includes a beacon slot 314, an active slot 315, and an inactive slot 316. A $13^{th}$ superframe includes a beacon slot 317, an active slot 318, and an inactive slot 319. A $14^{th}$ superframe includes a beacon slot 320, an active slot 321, and an inactive slot 322. When completing the single beacon transmission window, the communication apparatus A' starts another beacon transmission window. The other beacon transmission window also includes four superframes.

Similarly, the communication apparatus B' in a same network has a size of the beacon transmission window W identical to the size of the communication apparatus A'. In FIG. 3, two beacon transmission windows of the communication apparatus B' are illustrated. A first beacon transmission window includes a $21^{st}$ superframe, a $22^{nd}$ superframe, a $23^{rd}$ superframe, and a $24^{th}$ superframe. The $21^{st}$ superframe and the $22^{nd}$ superframe are not illustrated in FIG. 3. A beacon slot and an active slot of the $23^{rd}$ superframe are not illustrated, and a portion of an inactive slot 323 is illustrated in FIG. 3. The $24^{th}$ superframe includes a beacon slot 324, an active slot 325, and an inactive slot 326. A second beacon transmission window includes a $31^{st}$ superframe, a $32^{nd}$ superframe, a $33^{rd}$ superframe, and a $34^{th}$ superframe. The $31^{st}$ superframe includes a beacon slot 327, an active slot 328, and an inactive slot 329. The $32^{nd}$ superframe includes a beacon slot 330, an active slot 331, and an inactive slot 332. The $33^{rd}$ superframe includes a beacon slot 333, an active slot 334, and an inactive slot 335. A portion of the inactive slot 335 and the $34^{th}$ superframe are not illustrated in FIG. 3. As described above, when completing the single beacon transmission window, the communication apparatus B' starts another beacon transmission window. The other beacon transmission window also includes a same number of superframes of a previous beacon transmission window.

In the exemplary embodiment of the present invention, a total interval of superframes included in the single beacon transmission window is identical to the beacon interval 130 of the IEEE 802.15.4. The total interval of superframes included in the beacon transmission window described above corresponds to a beginning of the beacon slot 311 to an end of the inactive slot 322. Specifically, in the present invention, a single superframe in the IEEE 802.15.4 is divided and a plurality of superframes is constructed.

A communication apparatus selects a single superframe from among superframes included in the beacon transmission window. In this instance, the communication apparatus stochastically selects the single superframe. Specifically, when the communication apparatus selects the single superframe of W consecutive superframes included in the beacon transmission window, the selected superframe is not fixed as an $N^{th}$ superframe, and is possible to change. In this instance, the N indicates a value from 1 to W.

The communication apparatus A' selects a second superframe from among superframes included in the beacon transmission window. The communication apparatus B' selects a $31^{st}$ superframe from among superframes included in the second beacon transmission window. In the present invention, the beacon is transmitted in a beacon slot of the selected superframe from among the superframes included in the beacon transmission window. Also, the beacon is not transmitted in a beacon slot of unselected superframe.

In the present invention, when selecting the single superframe of the W consecutive superframes included in the beacon transmission window, the selected single superframe is stochastically or randomly selected. Accordingly, a collision of beacons is not permanent, although the beacons which are transmitted by two communication apparatuses in a network collide. As an example, in FIG. 3, although the communication apparatus A' and the communication apparatus B' simultaneously start the beacon transmission window, and select a superframe which starts in the beacon transmission window at a same time, each of the communication apparatus A' and the communication apparatus B' may select a different superframe in a subsequent beacon transmission window. Accordingly, a permanent beacon collision does not occur, and thus a service hole problem may be overcome.

When starting each of the superframes of the W consecutive superframes included in the beacon transmission window, the communication apparatus A' determines whether a superframe to be started is the selected superframe.

At a scheduled time, the communication apparatus A' starts the $11^{th}$ superframe. In this instance, the $11^{th}$ superframe, i.e. the superframe to be started, is different from the selected superframe. Accordingly, the communication apparatus A' does not transmit the beacon in the beacon slot 311 of the $11^{th}$ superframe, and starts the superframe. Specifically, the beacon is not transmitted in the beacon slot 311, and thus the beacon slot 311 is a vacant beacon slot. Although the communication apparatus A' does not transmit the beacon in the beacon slot 311, the communication apparatus A' starts the active slot 312 when a time to start the active slot 312 by the timer comes. The communication apparatus A' transmits data in the active slot 312 or waits for receiving the data to be started. In a conventional hard-time beacon scheme, a superframe is started by a beacon transmission every time. However, according to the present invention, a superframe which is started without the beacon transmission exists. In the present invention, the $11^{th}$ superframe, the $13^{th}$ superframe, and the $14^{th}$ superframe are included in the superframe which is started without the beacon transmission. In the present invention, the superframe which is started without the beacon transmission is called a superframe by timer.

Similarly, although the communication apparatus A' does not transmit the beacon in the beacon slot 311, when the active slot 312 is completed, the communication apparatus A' starts the inactive slot 313 and sleeps in the inactive slot 313. Minimizing power consumption is crucial to the communication apparatus. According to the present invention, even when the communication apparatus does not transmit the beacon, the communication apparatus may sleep in the inactive slot. Accordingly, the power consumption of the communication apparatus may be reduced. As described above, according to the present invention, even when the beacon is not transmitted, a characteristic of the hard-time beacon scheme maintains.

When the inactive slot 313 is completed, the communication apparatus prepares to start the $12^{th}$ superframe, i.e. the subsequent superframe. When starting the $12^{th}$ superframe, the communication apparatus A' determines whether the superframe to be started is the selected superframe. In the exemplary embodiment of the present invention, the $12^{th}$ superframe is the selected superframe.

At the scheduled time, the communication apparatus A' prepares to start the $12^{th}$ superframe. In this instance, since the $12^{th}$ superframe, i.e. the superframe to be started, is the selected superframe, the communication apparatus A' transmits the beacon in the beacon slot 314 of the $12^{th}$ superframe and starts the superframe. After transmitting the beacon in the beacon slot 314, the communication apparatus A' starts the active slot 312. The communication apparatus A' transmits the data or waits for receiving the data to be started. In the present invention, the $12^{th}$ superframe corresponds to a superframe which is started by the beacon transmission. In the present invention, the superframe which is started by the beacon transmission is called a superframe by beacon. When completing the active slot 312, the communication apparatus A' starts the inactive slot 313, and sleeps during the inactive slot 313.

At the scheduled time, the communication apparatus A' prepares to start the $13^{th}$ superframe. In this instance, since the $13^{th}$ superframe, i.e. the superframe to be started, is different from the selected superframe, the communication apparatus A' does not transmit the beacon in the beacon slot 317 of the $13^{th}$ superframe, and starts the superframe. Similar to the $11^{th}$ superframe, the communication apparatus A' starts the active slot 318 and the inactive slot 319.

When completing the $13^{th}$ superframe and the $14^{th}$ superframe, the communication apparatus A' starts another beacon transmission window. The other beacon transmission window includes the W consecutive superframes like the previous beacon transmission window. In the exemplary embodiment of the present invention, W is 4. The single superframe of the W consecutive superframes is selected, and thereby becomes the superframe by beacon. Also, W−1 number of consecutive superframes, which are not selected, becomes the superframe by timer.

According to another exemplary embodiment of the present invention, the beacon is not transmitted in a beacon slot of at least one superframe of the W−1 number of consecutive superframes excluding the selected single superframe from the W consecutive superframes included in the beacon transmission window, and the superframe by timer may be started. In this case, the beacon may be transmitted in at least two beacon slots in the single beacon transmission window.

In the present invention, even when the beacon is not transmitted in the beacon slot, a beacon interval 360 is defined as an interval between adjacent beacon slots. In the exemplary embodiment of the present invention, the total interval of the superframe included in the single beacon transmission window is identical to the beacon interval of the IEEE 802.15.4. Accordingly, when the single beacon transmission window includes the W consecutive superframes, the beacon interval 360 in the exemplary embodiment of the present invention corresponds to 1/W of the beacon interval of the IEEE 802.15.4.

Also, in a similar way as the beacon is transmitted once during the beacon interval of the IEEE 802.15.4, it is guaranteed that the beacon is transmitted once during a same time period as the beacon interval of the IEEE 802.15.4 in the present invention. Accordingly, a disadvantage such as a long waiting period for the beacon does not occur. Also, in the present invention, a period of time of total active slots and a period of time of total inactive slots during the beacon transmission window are identical to a period of time of active slots and a period of time of inactive slots in the beacon interval of the IEEE 802.15.4 in total, which indicates a harmonization with the IEEE 802.15.4.

Figure 4:
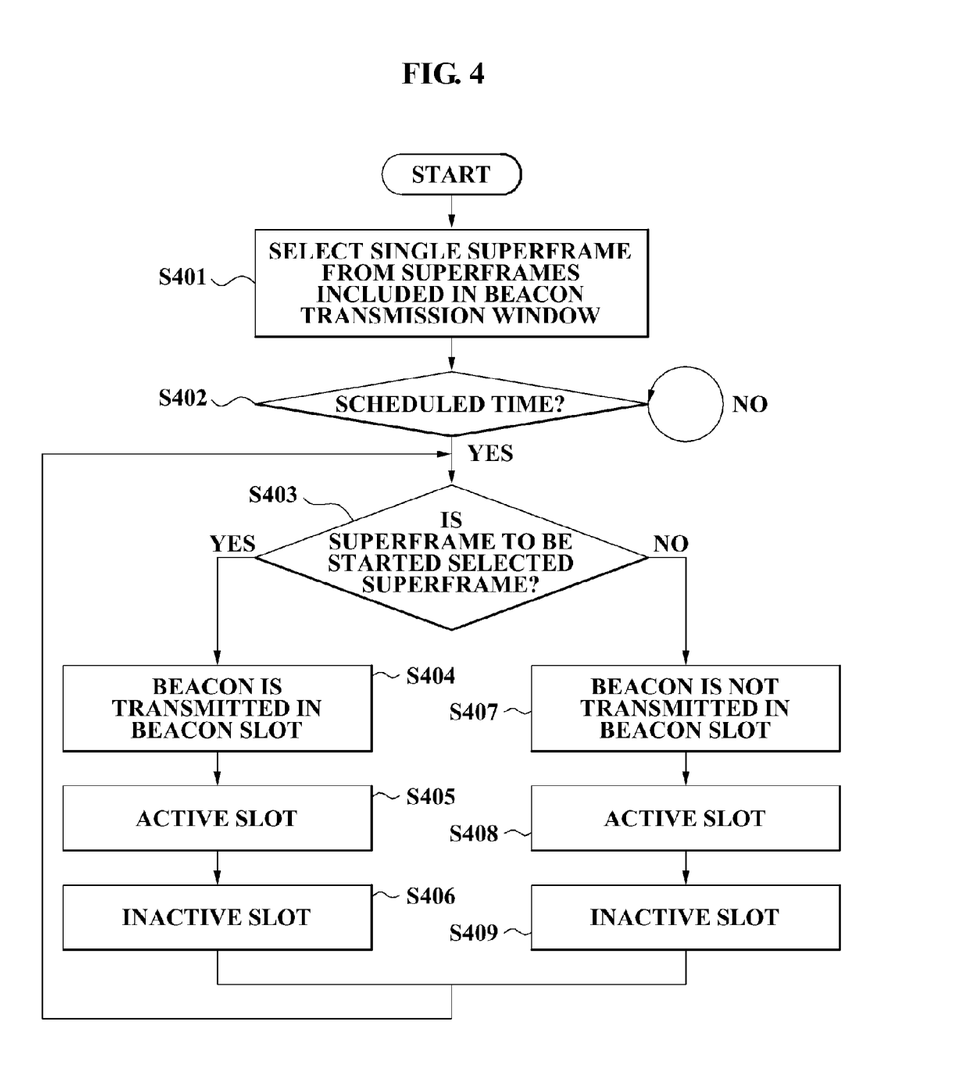
FIG. 4 is a flowchart illustrating a hard-time beacon transmission method according to an exemplary embodiment of the present invention.

FIG. 4 is a flowchart illustrating a hard-time beacon transmission method according to an exemplary embodiment of the present invention.

In operation S401, a communication apparatus selects a single superframe from superframes included in a beacon transmission window. In this instance, the beacon transmission window indicates predetermined W consecutive superframes. A size of the beacon transmission window W indicates a number of superframes included in the beacon transmission window, which is greater than or equal to 2. The single superframe from the W consecutive superframes is selected, and thereby becomes a superframe by beacon. Also, W−1 number of superframes, which are not selected, become a superframe by timer.

Each of the W superframes includes a first time period, a second time period, and a third time period. The first time period, the second time period, and the third time period are exclusive of each other. In the exemplary embodiment of the present invention, the first time period indicates a beacon slot, the second time period indicates an active slot, and the third time period indicates an inactive slot. The superframes included in the beacon transmission window are equal in length.

The communication apparatus starts another beacon transmission window, when completing a single beacon transmission window. The other beacon transmission window also includes the W consecutive superframes. In the exemplary embodiment of the present invention, a total interval of superframes included in the single beacon transmission window is identical to a beacon interval 130 of the IEEE 802.15.4. The total interval of superframes included in the single beacon transmission window has been described with reference to FIG. 3.

The communication apparatus may stochastically select a single superframe, when selecting the single superframe from superframes included in the beacon transmission window. Specifically, when the communication apparatus selects the single superframe from the W consecutive superframes included in the beacon transmission window, the selected superframe is not fixed as an $N^{th}$ superframe, and is possible to change. In this instance, N indicates a value from 1 to W. Also, when selecting the single superframe from the superframes included in the beacon transmission window, the beacon may be randomly selected.

In operation S402, the communication apparatus determines whether a scheduled time to start each of the W consecutive superframes comes. When the scheduled time comes, the communication apparatus performs operation S403. A timer generates a timer event at a time interval that is practically the same as the beacon interval 360, since a beacon slot is a very small time interval. The communication apparatus wakes up at every beacon interval 360 by the timer event, and starts the superframe by timer or the superframe by beacon.

In operation S403, when the scheduled time comes, the communication apparatus determines whether a superframe to be started is a selected superframe.

As a result of the determination in operation S403, when the superframe to be started is the selected superframe, the communication apparatus transmits a beacon in a beacon slot of the selected superframe in operation S404.

After transmitting the beacon in the beacon slot, the communication apparatus starts an active slot in operation S405. The communication apparatus transmits data in the active slot or waits for receiving the data to be started. In this instance, the superframe is started by a beacon transmission, and thereby corresponds to the superframe by beacon.

When the active slot is completed, the communication apparatus starts an inactive slot, and sleeps during the inactive slot in operation S406. Also, the communication apparatus returns to operation S403, and determines whether a superframe to be subsequently started is the selected superframe.

As the result of the determination in operation S403, when the superframe to be started is different from the selected superframe, the communication apparatus does not transmit the beacon in the beacon slot of the selected superframe and starts the superframe in operation S407.

Although the communication apparatus does not transmit the beacon in the beacon slot, in operation S408, when a time to start the active slot by the timer comes, the communication apparatus starts the active slot. The communication apparatus transmits the data or waits for receiving the data to be started. In a conventional hard-time beacon scheme, a superframe is started by the beacon transmission every time. However, according to the present invention, a superframe which is started without the beacon transmission exists. The superframe in the exemplary embodiment of the present invention is started without the beacon transmission, and thereby corresponds to the superframe by timer.

Similarly, although the communication apparatus does not transmit the beacon in the beacon slot, when the active slot is completed, the communication apparatus starts the inactive slot and sleeps during the inactive slot in operation S409. According to the present invention, the communication apparatus may sleep in the inactive slot even when the beacon is not transmitted. Accordingly, a power consumption of the communication apparatus may be reduced. When completing the inactive slot in operation S409, the communication apparatus returns to operation S403, and prepares to start a subsequent superframe.

When completing the single beacon transmission window, the communication apparatus starts another beacon transmission window. The other beacon transmission window includes the W consecutive superframes like previous beacon transmission window. The single superframe of the W consecutive superframes is selected and thereby becomes the superframe by beacon. Also, W−1 number of consecutive superframes, which are not selected, becomes the superframe by timer.

Figure 5:
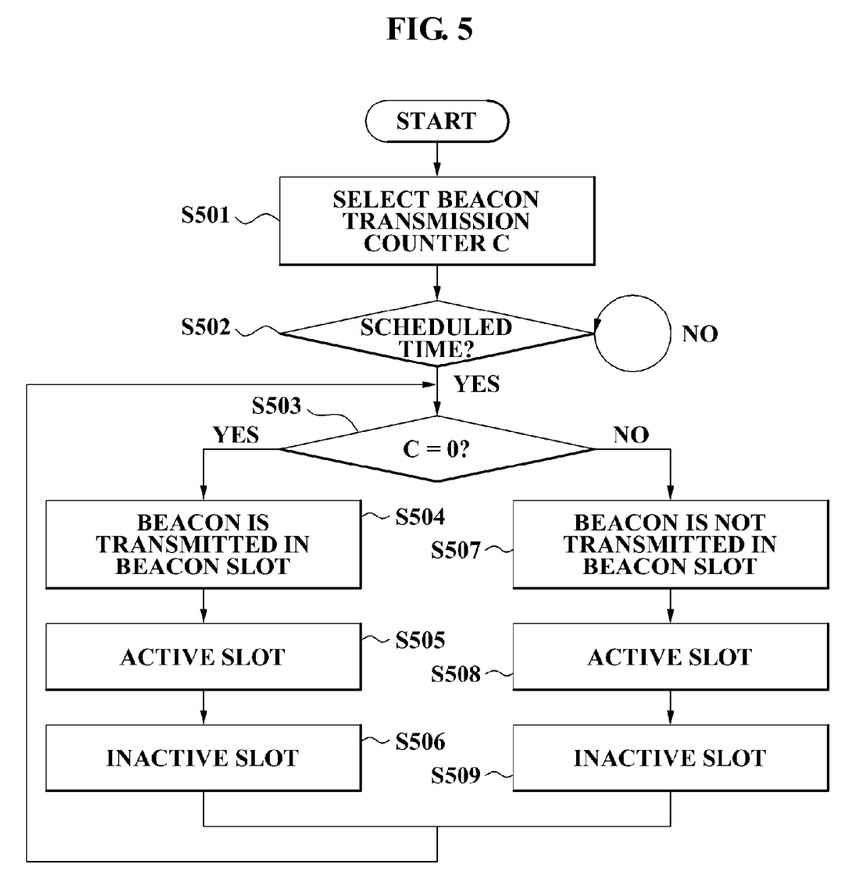
FIG. 5 is a flowchart illustrating a hard-time beacon transmission method according to another exemplary embodiment of the present invention.

FIG. 5 is a flowchart illustrating a hard-time beacon transmission method according to another exemplary embodiment of the present invention.

A beacon transmission window is defined. The beacon transmission window corresponds to predetermined W consecutive superframes. A size of the beacon transmission window W indicates a number of consecutive superframes included in the beacon transmission window, which is greater than or equal to 2. Each of the superframes includes a first time period, a second time period, and a third time period. The first time period, the second time period, and the third time period are exclusive of each other. In the exemplary embodiment of the present invention, the first time period indicates a beacon slot, the second time period indicates an active slot, and the third time period indicates an inactive slot.

In operation S501, the communication apparatus selects one value from 0 to W−1 as a beacon transmission counter C. When selecting the beacon transmission counter C, the communication apparatus may stochastically or randomly select the one value from 0 to W−1.

In operation S502, the communication apparatus determines whether a scheduled time to start each of the W number of consecutive superframes comes. When the scheduled time comes, the communication apparatus performs operation S503. A timer generates a timer event at a time interval that is practically the same as a beacon interval 360, since a beacon slot is a very small time interval. The communication apparatus wakes up at every beacon interval 360 by the timer event.

In operation S503, when starting the superframe at the scheduled time, the communication apparatus determines whether the beacon transmission counter C is 0.

As a result of the determination in operation S503, when the beacon transmission counter C is 0, the communication apparatus transmits the beacon in the beacon slot of the superframe in operation S504.

After transmitting the beacon in the beacon slot, the communication apparatus starts the active slot in operation S505. The communication apparatus transmits data in the active slot or waits for receiving the data to be started. In this instance, the superframe is started by a beacon transmission, and thereby corresponds to the superframe by beacon.

After the active slot is completed, the communication apparatus starts the inactive slot in operation S506, and sleeps during the inactive slot in operation S506. Also, the communication apparatus returns to operation S503.

As the result of the determination in operation S503, when the beacon transmission counter C is not 0, the communication apparatus does not transmit the beacon in the beacon slot of the superframe, and starts the superframe in operation S507. That is, the communication apparatus skips the beacon transmission. Also, the beacon transmission counter C is reduced by 1.

Although the communication apparatus does not transmit the beacon in the beacon slot, in operation S508, when a time to start the active slot by the timer comes, the communication apparatus starts the active slot. The communication apparatus transmits the data or waits for receiving the data to be started. In a conventional hard-time beacon scheme, a superframe is started by the beacon transmission at all times. However, according to the present invention, a superframe which is started without the beacon transmission exists. The superframe in the exemplary embodiment of the present invention is started without the beacon transmission, and thereby corresponds to the superframe by timer.

Similarly, although the communication apparatus does not transmit the beacon in the beacon slot, when the active slot is completed, the communication apparatus starts the inactive slot and sleeps during the inactive slot in operation S509. When the inactive slot is completed in operation S509, the communication apparatus returns to operation S503, and prepares to start a subsequent superframe.

When completing the single beacon transmission window, the communication apparatus starts another beacon transmission window. The other beacon transmission window includes the W consecutive superframes like the previous beacon transmission window. The single superframe of the W consecutive superframes is selected, and thereby becomes the superframe by beacon. Also, W−1 number of consecutive superframes, which are not selected, becomes the superframe by timer.

The above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, a stochastic beacon transmission method and apparatus thereof may overcome a service hole problem, when nodes in a network use a hard-time beacon. That is, according to the present invention, a stochastic beacon transmission method and apparatus thereof eliminate a permanent beacon collision which occurs in a hard-time beacon scheme, and thereby may overcome problems caused by a beacon collision, for example, a disadvantage that a new node may not join. Also, according to the present invention, a stochastic beacon transmission method and apparatus thereof may eliminate a permanent beacon collision with little overhead.

Although above-described exemplary embodiments of the present invention is described in association with an IEEE 802.15.4, the present invention is not limited, and may be applicable to another type of wireless network environment.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A communication apparatus comprising a unit which selects a superframe from W consecutive superframes in a beacon transmission window, W being an integer equal to or greater than two, and starts a non-selected one of the W consecutive superframes without transmitting a beacon in a first time period of the non-selected one of the W consecutive superframes if the non-selected one of the W consecutive superframes is a superframe to be started,
wherein the selected superframe is stochastically selected from the W consecutive superframes,
wherein the superframe to be started comprises the first time period, a second time period and a third time period, and the first time period, the second time period, and the third time period are exclusive of each other,
wherein the communication apparatus transmits the beacon in the first time period of the selected superframe, if the superframe to be started is the selected superframe,
wherein the communication apparatus transmits data, or waits for receiving data in the second time period of the superframe to be started, and
wherein the communication apparatus sleeps in the third time period of the superframe to be started.

2. The communication apparatus of claim 1, wherein the communication apparatus does not transmit the beacon in first time periods of W−1 superframes of the W consecutive superframes excluding the selected superframe.

3. The communication apparatus of claim 1, wherein the communication apparatus does not transmit the beacon in a first time period of at least one superframe of W−1 superframes of the W consecutive superframes excluding the selected superframe.

4. The communication apparatus of claim 1, wherein a total interval of the W consecutive superframes is identical to a beacon interval of an IEEE 802.15.4 superframe.

5. The communication apparatus of claim 1, wherein the unit starts another one of the W consecutive superframes without transmitting a beacon in a first time period of the another one of the W consecutive superframes if the another one of the W consecutive superframes is different from the selected superframe.

6. A beacon transmission method, comprising:
selecting a superframe from W consecutive superframes in a beacon transmission window, W being an integer equal to or greater than two;
determining whether the superframe to be started is the selected superframe of the W consecutive superframes; and
starting one non-selected superframe of the W consecutive superframes without transmitting a beacon in a first time period of the one non-selected superframe, wherein the one non-selected superframe of the W consecutive superframes is a superframe to be started,
wherein the selected superframe is stochastically selected from the W consecutive superframes,
wherein the superframe to be started comprises the first time period, a second time period and a third time period, and the first time period, the second time period, and the third time period are exclusive of each other,
wherein a communication apparatus transmits the beacon in the first time period of the superframe to be started, if the superframe to be started is the selected superframe,
wherein the communication apparatus transmits data, or waits for receiving data in the second time period of the superframe to be started, and
wherein the communication apparatus sleeps in the third time period of the superframe to be started.

7. The method of claim 6, wherein the communication apparatus does not transmit the beacon in first time periods of W−1 superframes of the W consecutive superframes excluding the selected superframe.

8. The method of claim 6, wherein the communication apparatus does not transmit the beacon in a first time period of at least one superframe of W−1 superframes of the W consecutive superframes excluding the selected superframe.

9. The method of claim 6, wherein a total interval of the W consecutive superframes is identical to a beacon interval of IEEE 802.15.4 superframe.

10. The method of claim 6, wherein each of the W consecutive superframes are equal in length.

11. The method of claim 6 further comprising starting another superframe one of the W consecutive superframes without transmitting a beacon in a first time period of the another superframe.

12. A beacon transmission method, comprising:
selecting a value from 0 to W−1 as a beacon transmission counter, W being an integer equal to or greater than two indicating a predetermined number of consecutive superframes;
transmitting a beacon in a first time period of a superframe to be started, if each of W consecutive superframes starts and a beacon transmission counter corresponds to 0; and
decreasing the beacon transmission counter by 1 and not transmitting the beacon in the first time period of the superframe to be started, if the each of the W consecutive superframes starts and the beacon transmission counter is different from 0,
wherein the selected superframe is stochastically selected from the W consecutive superframes,
wherein the superframe to be started comprises the first time period, a second time period and a third time period, and the first time period, the second time period, and the third time period are exclusive of each other,
wherein a communication apparatus transmits data, or waits for receiving data in the second time period of the superframe to be started, and
wherein the communication apparatus sleeps in the third time period of the superframe to be started.

13. A non-transitory computer-readable storage medium storing a program for executing a beacon transmission method, the method comprising:
a first instruction set which selects a superframe of W consecutive superframes in a beacon transmission window, W being an integer equal to or greater than two; and
a second instruction set which starts a non-selected one of the W consecutive superframes without transmitting a beacon in a first time period of the non-selected superframe, if the non-selected superframe is a superframe to be started,
a third instruction set which transmits the beacon in the first time period of a selected superframe, if the selected superframe is the superframe to be started,
wherein the selected superframe is stochastically selected from the W consecutive superframes,
wherein the superframe to be started comprises the first time period, a second time period and a third time period, and the first time period, the second time period, and the third time period are exclusive of each other,
wherein in the second time period of the superframe to be started data is transmitted, or reception of data is awaited, and
wherein a sleep period is implemented in the third time period of the superframe to be started.

* * * * *